April 25, 1939. W. L. BLACKWELDER 2,156,007
SUPPORTING DEVICE FOR REVOLVING FLAT CARDS
Filed May 26, 1938 2 Sheets-Sheet 1

W. L. BLACKWELDER
INVENTOR.

BY CA Snow Co.

ATTORNEYS.

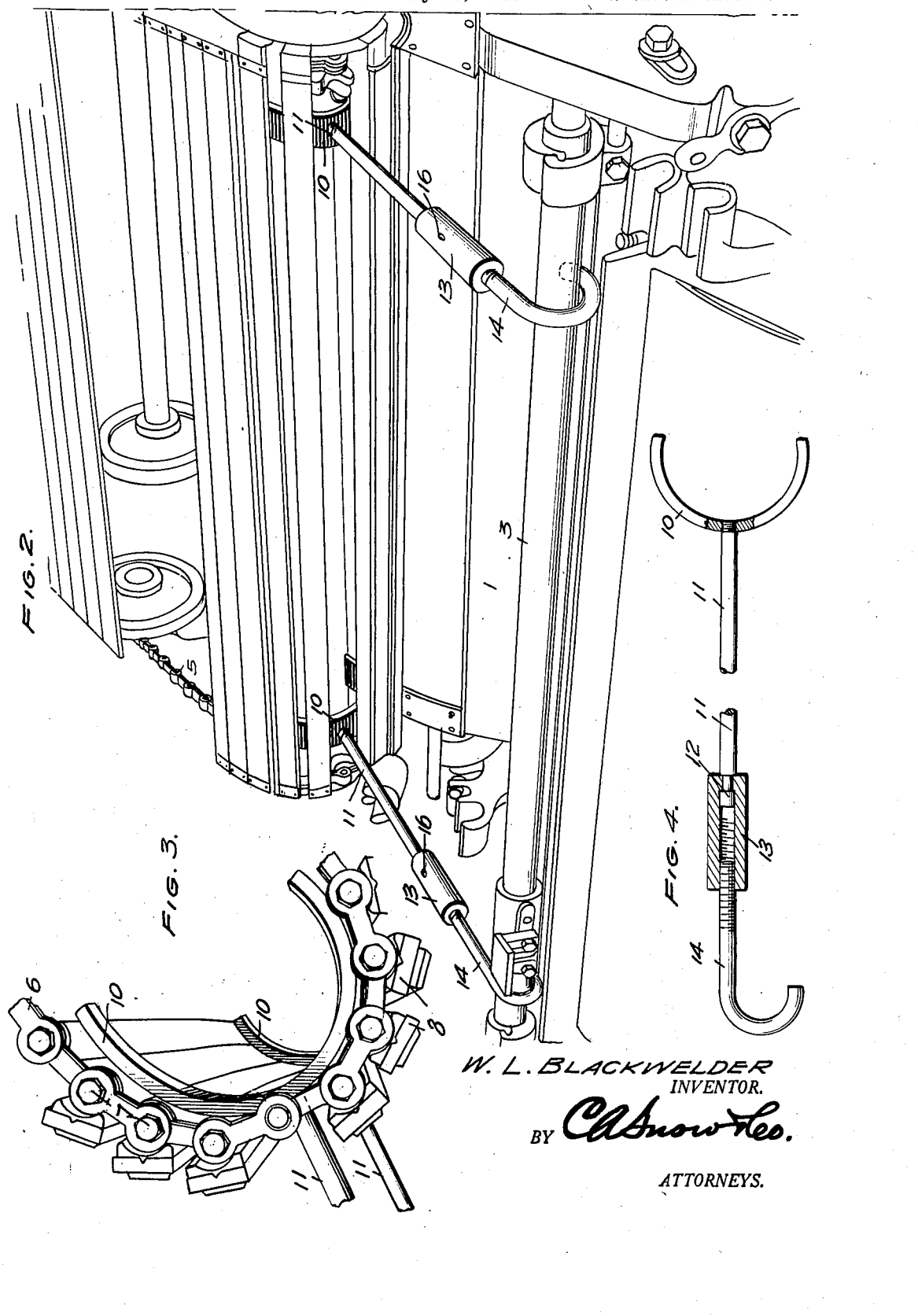

Patented Apr. 25, 1939

2,156,007

UNITED STATES PATENT OFFICE 2,156,007

SUPPORTING DEVICE FOR REVOLVING FLAT CARDS

William L. Blackwelder, Concord, N. C.

Application May 26, 1938, Serial No. 210,243

4 Claims. (Cl. 19—102)

The object of this invention is to provide novel means for supporting the sprocket chains and top flaps of a carding machine, when the front shaft and the sprocket wheels, which carry the chains, have been removed in order to repair bearings and for analogous purposes.

Other objects will appear as the description proceeds.

In the accompanying drawings:

Figure 2 is a perspective view of a portion of a carding machine, showing a slightly modified form of the invention, the carding machine being provided with a vacuum stripper;

Figure 3 is an enlarged detailed perspective view showing the arch or foot in relation to the sprocket chains and associated parts;

Figure 4 is a side elevation, partly in section, the view showing the card-supporting device which forms the subject-matter of this application.

Figure 1:
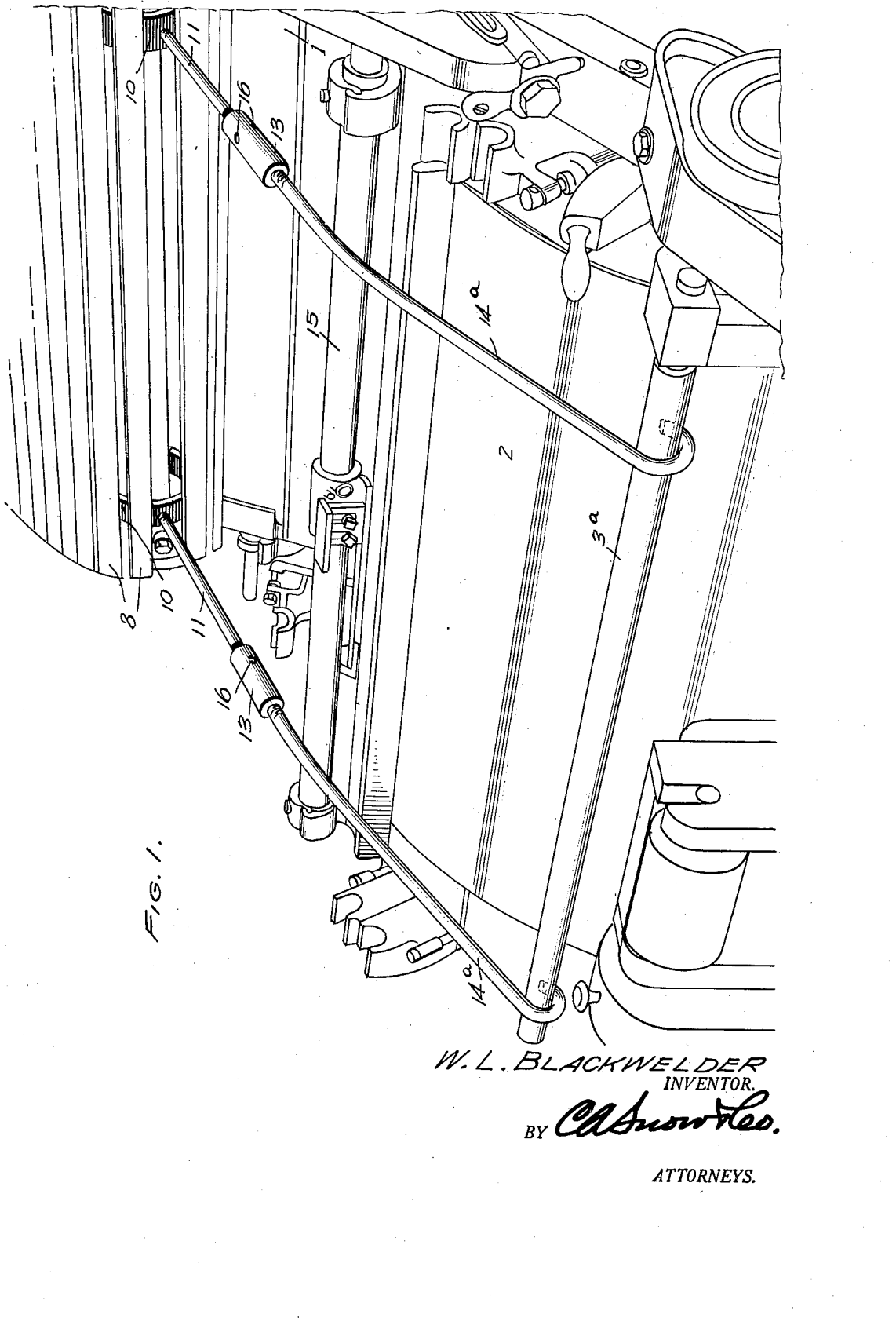
Figure 1 is a perspective view of a portion of a carding machine, showing the invention in position thereon, the machine having no vacuum stripper.

In the drawings there is shown a carding machine 1, including the usual doffer drum 2, and a cross rod 3 upon which a vacuum stripper, if employed, may reciprocate.

The top flats 8 of the machine are carried by transversely spaced sprocket chains 5 and 6.

At times it is necessary to remove the front driving shaft and the sprocket wheels which carry the chains 5 and 6, while the bearings are being repaired, and it is the purpose of the present invention to provide means for supporting and holding the sprocket chains, when the driving shaft and the sprocket wheels have been removed for repair.

The invention specifically comprises a substantially U-shaped supporting arch 10, to which is connected one end of a rod 11, the opposite end of the rod being provided with a head 12 which is received in one end of a rotatable adjusting sleeve 13. The opposite end of the sleeve 13 is internally threaded to receive the threaded end of a hook 14, and in supporting the chains 5 and 6 during repairs, the U-shaped arch 10 will be positioned between the sprocket chains, in engagement with the inner surfaces of the flats 8, the hook 14 being engaged with the cross rod 3 of the carding machine. As illustrated in the drawings, the device forming the subject-matter of this application is employed in duplicate, for the more satisfactory support of the sprocket chains 5 and 6. By rotating the sleeve 13, the sprocket chains 5 and 6 may be tightened, their upper and lower runs being held spaced apart during the making of repairs.

In Figure 1 of the drawings, the hook members 14a are considerably longer than the hook members 14 illustrated in Figure 2, since the cross rod 3a of Fig. 1 is more remote than the cross rod 3 of Fig. 2. In the form illustrated in Figure 1, the hook members 14a are of obtusely angular form, to pass over and engage a readily-identified part 15 of the machine, said part furnishing additional support for the longitudinally-adjustable structures 11—13—14, which carry the sprocket chains 5 and 6.

Openings 16 in the adjusting sleeves 13 facilitate the rotation of the sleeves. The arches 10 are of such width and thickness that they will have adequate strength.

Although preferred structure is shown, changes may be resorted to, within the scope of what is claimed, without departure from the spirit of the invention.

Having thus described my invention what I claim as new and desire to secure by Letters Patent of the United States is:

1. A device for supporting a portion of a carding machine, to wit, the top flats and the sprocket chains which carry the top flats, when the front shaft of the machine and the shaft-carried and chain-engaging sprocket wheels are removed: the device comprising a connection and means for changing the length of the connection at the will of an operator, one end portion of the connection being provided with an anchorage means formed for detachable assembly with a part of a carding machine, and means carried by the opposite end portion of the connection for detachable assembly with said portion of a carding machine.

2. A device for supporting a portion of a carding machine, to wit, the top flats and the sprocket chains which carry the top flats, when the front shaft of the machine and the shaft-carried and chain-engaging sprocket wheels are removed, constructed as set forth in claim 1, and wherein the last-specified means is a transverse foot, presenting to said portion of a carding machine, a face which is curved to approximate the periphery of the sprocket wheel which has been removed.

3. A device for supporting a portion of a carding machine, to wit, the top flats and the sprocket chains which carry the top flats, when the front shaft of the machine and the shaft-carried and chain-engaging sprocket wheels are removed, constructed as set forth in claim 1, and wherein the connection deviates from straight-line form sufficiently so that, intermediate its ends, it may extend above and engage in supporting relation, a transverse part of a carding machine.

4. A device for supporting a portion of a carding machine, to wit, the top flats and the sprocket chains which carry the top flats, when the front shaft of the machine and the shaft-carried and chain-engaging sprocket wheels are removed, the device comprising a connection including rods, a turnbuckle connecting the inner ends of the rods, one rod being provided at its outer end with a hook for detachable anchorage assembly with a part of a carding machine, and a transverse foot on the outer end of the other rod, the foot presenting to said portion of a carding machine, a face which is curved to approximate the periphery of the sprocket wheel which has been removed.

WILLIAM L. BLACKWELDER.